United States Patent [19]
Leibfried

[11] Patent Number: 5,692,881
[45] Date of Patent: Dec. 2, 1997

[54] HOLLOW METALLIC STRUCTURE AND METHOD OF MANUFACTURE

[75] Inventor: Peter Eugene Leibfried, Vernon, Conn.

[73] Assignee: United Technologies Corporation, Hartford, Conn.

[21] Appl. No.: 488,475

[22] Filed: Jun. 8, 1995

[51] Int. Cl.$^6$ ............................ F01D 5/18; B23K 20/20
[52] U.S. Cl. .................... 416/233; 428/593; 228/157; 29/889.72
[58] Field of Search .................. 228/157; 29/889.72; 428/593; 416/233

[56] References Cited

U.S. PATENT DOCUMENTS

| | | | |
|---|---|---|---|
| 3,920,175 | 11/1975 | Hamilton et al. | 228/173 |
| 4,217,397 | 8/1980 | Hayase et al. | 428/594 |
| 4,292,375 | 9/1981 | Ko | 228/157 X |
| 4,304,821 | 12/1981 | Hayase et al. | 428/593 |
| 4,351,470 | 9/1982 | Swadling et al. | 228/157 |
| 4,393,987 | 7/1983 | Anderson et al. | 228/157 |
| 4,530,197 | 7/1985 | Rainville | 52/797 |
| 5,024,369 | 6/1991 | Froes et al. | 228/157 |
| 5,240,376 | 8/1993 | Velicki | 416/229 A |
| 5,384,959 | 1/1995 | Velicki | 29/889.72 |
| 5,419,040 | 5/1995 | Weisse et al. | 29/889.72 |
| 5,431,327 | 7/1995 | Dunford et al. | 228/157 |

*Primary Examiner*—Kenneth J. Ramsey

[57] ABSTRACT

The structure and process for making a hollow article in which the core structure is formed from two cell sheets diffusion bonded to a rib pattern sheet having a preselected pattern of ribs having passageways. The cell sheets are diffusion bonded to the rib pattern sheet using tooling pattern sheets having a geometry matching that of the rib pattern sheet thereby creating contiguous cells, interconnected by the passageways, between the cell sheets at each rib and the periphery of the structure. Inert gas is then applied to the cells during a superplastic forming process to create expanded envelopes of each cell of the core. Face sheets of the sandwich structure may then be formed from the cell sheets themselves by further expanding the cell sheets out against a mold surface. Alternatively, the envelopes of the core may be expanded and simultaneously or subsequently diffusion bonded to separate face sheets. The contour of the core may be performed, formed concurrently with separate face sheets in a single operation, or subsequently formed as a sandwich structure.

20 Claims, 5 Drawing Sheets

HOLLOW METALLIC STRUCTURE AND METHOD OF MANUFACTURE

TECHNICAL FIELD

This invention relates generally to the production of superplastically formed metallic structures and more specifically to hollow metallic sandwich structures superplastically formed from metal cell sheets diffusion bonded to a metallic rib pattern sheet. The invention also includes the use of sandwich structures as part of more complex structures such as airfoils.

BACKGROUND OF THE INVENTION

Metals having superplastic characteristics, such as titanium and its alloys, exhibit properties analogous to viscous fluids at appropriate elevated temperatures, typically 1700° F. for titanium alloys. Specifically, superplasticity refers to the ability to deform a metal up to several hundred percent within a particular range of strain rate without significant necking. This phenomenon has been utilized through various methods to produce intricate and complex articles.

Diffusion bonding is the joining of metal sheets through the application of heat and pressure which provides a metallurgical bond through the diffusion of atoms across the faces of the sheets. The joint thus formed exhibits the same metallurgical properties as, and is metallurgically indistinguishable from, the parent metal. It is commonly understood that many of the metals and their alloys that are superplastically formable are also generally diffusion bondable and that superplastic forming and diffusion bonding can generally be performed at the same temperatures and pressures. It is for this reason that combinations of these processes are employed to produce complex articles. Structures fabricated by superplastic forming and diffusion bonding are covered extensively in U.S. Pat. Nos. 4,217,397 and 4,304,821 and are incorporated herein by reference.

The need for light weight strong structures, especially in the aircraft and spacecraft industries, led to developments in the production of hollow articles using superplastic forming and diffusion bonding. Early developments used simple integrally stiffened hollow structures while more recently, increased strength to weight ratios have been achieved through more complex internal structures. One such type of structure of particular interest involves an airfoil wherein two sheets of superelastically formable and diffusion bondable material are selectively joined in a pattern to form internal pockets between the sheets. An inert gas is then injected into the pocket at a temperature that allows for superplastic forming to expand the pockets to form a stiffened hollow cell structure. Heretofore the joining of the sheets for theses structures has employed various types and combinations of both maskants and welding, each contributing in some fashion to problems that limit the structures' optimization.

The early use of maskants is exemplified in U.S. Pat. No. 3,920,175. Maskants are applied to workpieces in preselected locations to prevent bonding. In a subsequent operation the workpieces are superplastically shaped in non-bonded areas and produce a particular stiffening pattern defined by the bonded areas. Common maskant materials such as boron nitride and yttrium oxide work well to prevent bonding but pose other structural concerns. Firstly, the application must be performed meticulously to avoid contamination of areas to be bonded. The most common methods of application of maskants includes brushing and silk screening both of which can be erratic and inconsistent.

Secondly, these maskants can also cause embrittlement of the finished structure if they are not removed. In the types of structures of interest, namely complex hollow structures, it is virtually impossible to remove the maskant subsequent to bonding.

Another method commonly used to define the stiffening pattern in superplastic formed diffusion bonded hollow structures involves seam welding. A seam weld also has certain deficiencies. Firstly, the weld width is difficult to control accurately enough to produce uniform patterns. Secondly, the weld itself produces fatigue sensitive areas in locations where the workpieces pull away from the weld during superplastic forming. For these reasons it is suggested that welding be avoided in superplastic formed diffusion bonded highly stressed aircraft structure in U.S. Pat. No. 4,351,470. Thirdly, superplasticity may not occur at the same conditions, or at all, near the weld zone.

Still another method of producing light weight high strength hollow structures involves the machining of the core elements and subsequent diffusion bonding to produce hollow fan blades. This practice is taught in applicant's U.S. Pat. No. 5,419,040. This method avoids the problems of a separate operation to join workpieces to define a stiffening pattern as the stiffening pattern is machined directly. The machined pieces are subsequently diffusion bonded to produce the hollow structure. The major drawbacks to this method are the high costs reflected by increased material usage and the labor intensive machining. In addition, the machined core elements must mate exactly with each other in a mold to achieve full bond strength without steps or gaps. The assignee of the present invention utilizes a variation of this process to produce hollow titanium fan blades for turbine aircraft engines. The current process comprises the 5 axis machining of airfoil and integral hollow stiffening pattern halves from a billet of solid titanium, and the subsequent diffusion bonding of the halves to each other in highly precise matched metal dies, in a heated platen press at high operating pressures.

Although superplastically formed diffusion bonded hollow articles offer many structural advantages, applicant is unaware of any commercially feasible method of producing these articles without the use of internal maskants, seam welding or extensive machining.

SUMMARY OF THE INVENTION

In general, the present invention provides a hollow inflated metallic article and a method for producing the article from a plurality of workpieces diffusion bonded together. The diffusion bonding can occur before or during inflation. The hollow article is comprised of a rib pattern sheet with at least one aperture formed within. The perimeter of the aperture forms ribs within the rib pattern sheet. Cell sheets are positioned on both sides of the rib pattern sheet and are diffusion bonded to the rib pattern sheet at the rib locations to form at least one hollow closed cell there between.

The use of bonding aids such as thin aluminum sheet between the cell sheets and the rib pattern sheet at the rib locations is well known in the industry to insure adequate and complete bonding and may be used in an alternative embodiment. The diffusion bonding is carried out by applying heat and force to the core sheet and rib pattern sheet stack-up. The force is best exercised by applying a load from an external source to two tooling pattern sheets, having the same geometry as the rib pattern sheet, positioned on either side of the cell sheet and rib sheet stack-up and in the same orientation as the rib pattern sheet. The tooling pattern sheets are coated with a stop off material to preclude their bonding with the cell sheets during the diffusion bonding operation. The hollow closed cell is connected to the exterior via a passageway located within the rib pattern sheet to allow for fluid flow from an external source. In a variation of the invention having more than one closed hollow cell, the cells are interconnected by means of one or more passageways between the cells to permit fluid flow between the cells. The invention as described permits combinations of infinite ultimate geometry based on the pattern within the rib pattern sheet.

According to another variation of the present invention, wherein at least one of the cell sheets is superplastically formable, at least one of the cell sheets is expanded between the ribs. The method of expansion is accomplished by the introduction of pressurized gas from an external source through the passageway into the closed cell at a temperature sufficient to superplastically form the cell sheet.

According to yet another variant of the present invention, the cells are superplastically expanded outward from the ribs against a die which limits and shapes the outward expansion of the cells. The continued expansion of the core sheet forms double thickness vertical walls about the ribs and eventually the walls of adjacent cells come into contact and diffusion bond to each other.

According to yet another variant of the present invention a contoured sandwich structure is provided. In such a variant the hollow closed cells are ultimately expanded outward from the ribs against countered skins, such as an airfoil shape, and diffusion bonded.

According to yet another variant of the present invention the hollow closed cells are expanded outwardly from the ribs against any combination of structural members, including compatible metal matrix composite members, and diffusion bonded thereto to form a structural sandwich member.

BRIEF DESCRIPTION OF THE DRAWINGS

FIG. 3A is a cross-sectional view taken along line 3A—3A of FIG. 3.

FIG. 4A is a cross-sectional view taken along line 4A—4A of FIG. 4.

DESCRIPTION OF THE PREFERRED EMBODIMENT

Figure 1:
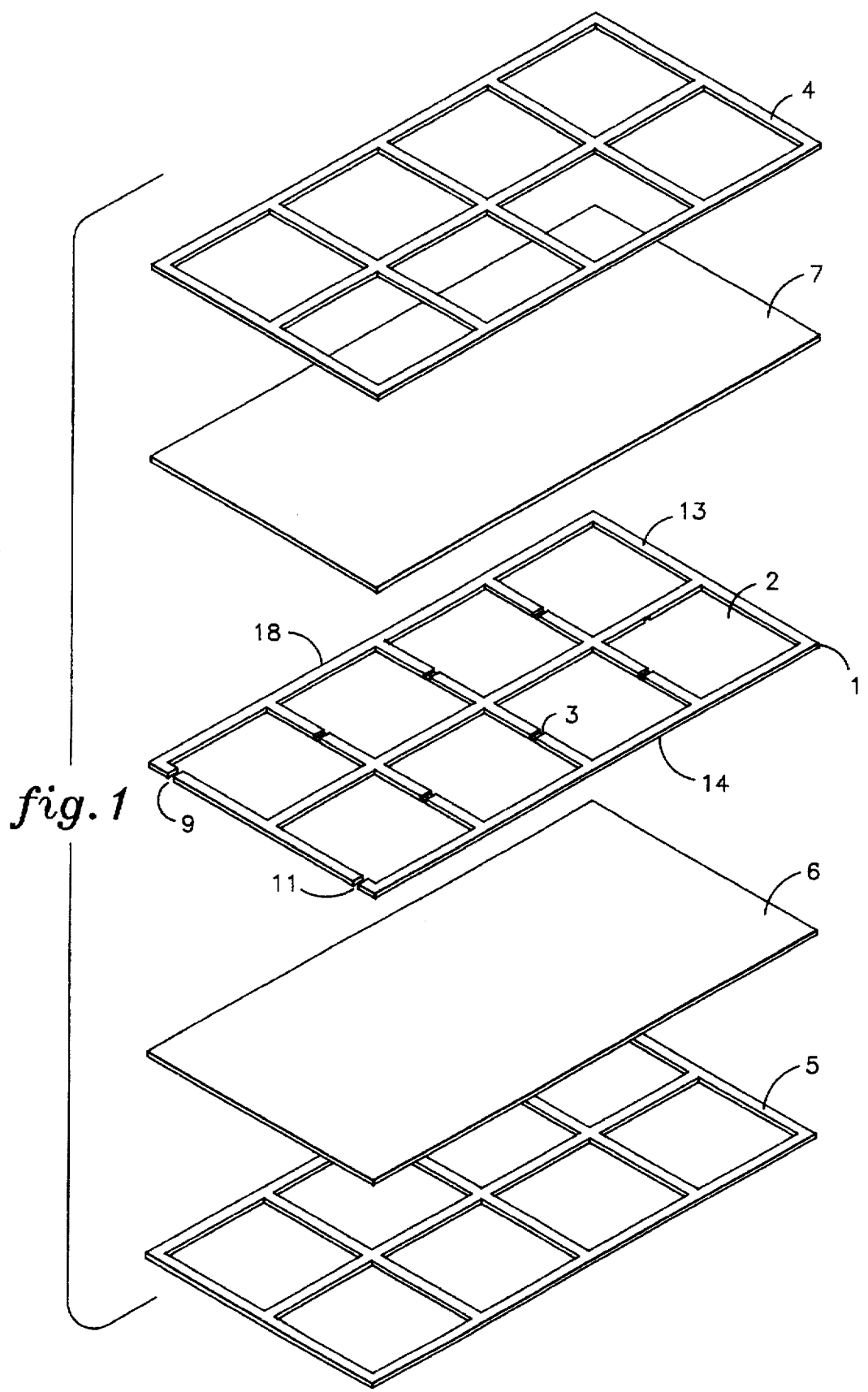
FIG. 1 is an exploded perspective illustration of a rib pattern sheet with passageways disposed between a pair of cell sheets and a pair of tooling pattern sheets.
Figure 2:
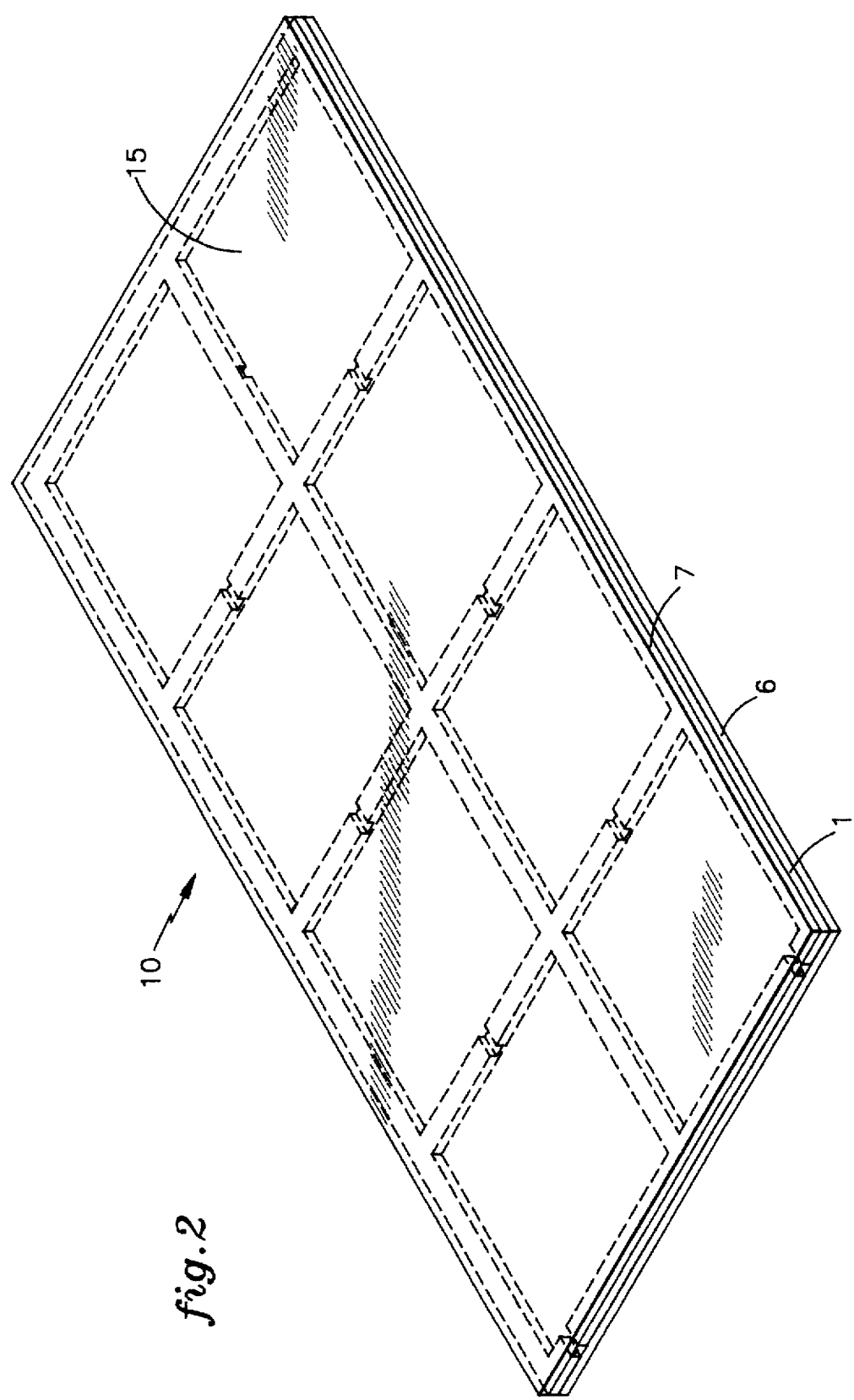
FIG. 2 is a perspective illustration of a rib pattern sheet diffusion bonded to a pair of cell sheets prior to superplastic forming.

The rib pattern sheet 1 shown in FIG. 1 illustrates an embodiment in which the aperture pattern forms eight rectangular cells. The rib pattern sheet 1 is sandwiched between two cell sheets 6,7 as shown in FIG. 2 to form a stack-up. Two tooling pattern sheets 4,5 are then placed onto each of the two cell sheets with a layer of stop off between them to prevent the bonding of the tooling pattern sheets to the rib pattern sheet and the platens. The tooling pattern sheets have a rib pattern corresponding to the pattern in the rib pattern sheet and in the preferred embodiment the tooling pattern sheets are made from the same material as the rib pattern sheet to match thermal expansion characteristics. The stack-up including the tooling pattern sheets is then placed in a platen press and subjected to a heated pressurization cycle to diffusion bond the cell sheets 6,7 to the rib pattern sheet at the rib locations 18 to form the hollow article as shown in FIG. 2. The lines in FIG. 2 at the rib pattern sheet and cell sheet intersections are shown to illustrate the bond line however, the bond lines are in fact not detectable in practice.

In the preferred embodiment the rib pattern sheet has two passageways to the exterior 9 and 11, and any number of internal passageways 3 preferably interconnecting all cells. Tubes, not shown, are attached to the entrance passageway 9 for the introduction of gas to the closed cells 15 and attached to the exit passageway 11 to exhaust and balance the gas pressure within the hollow article. The opposite ends of the tubes, not shown, are connected to an external source of inert gas, such as argon, at the entrance passageway 9, and to a pressure controller, not shown, or vented to atmosphere at the exit passageway 11 to control the internal pressure during the heating cycle due to expansion of the inert gas. The tooling pattern sheets 4,5 are coated with a stop off material such as boron nitride or yttrium oxide to preclude bonding with the cell sheets and the platens. The stack-up of the rib pattern sheet 1, the cell sheets 6, 7, and the tooling pattern sheets 4,5 are aligned using pins, not shown, and loaded into a commercially available platen press with vacuum capability. The tooling pattern sheets are not critical to the diffusion bonding process, however, they do aid to concentrate the press load at the rib locations and permit inflation. The entire stack-up is then heated to about 1650° F. to 1750° F. at a controlled rate under a nominal platen pressure load in a partial vacuum of $5 \times 10^{-4}$ Torr. The platen pressure load is then increased to 190 psi and held for 15 minutes, then raised to a level sufficient to cause approximately 5% upset in the rib pattern sheet and cell sheets, typically 380 psi. These conditions are maintained for thirty minutes to achieve a diffusion bond at the rib locations 18 between the cell sheets 6,7 and the rib pattern sheet 1. After the thirty minute hold the stack-up is cooled in a partially evacuated environment to 1300° F. to 1000° F. The platen press is then backfilled to a nominal pressure with Argon gas to increase the cooling rate and cooled to 400° F. before being opened to the atmosphere. The resulting hollow article 10 shown in FIG. 2 has closed cells 15 formed between the ribs 18 and the cell sheets 7,8 at the location of the apertures 2.

Figure 3:
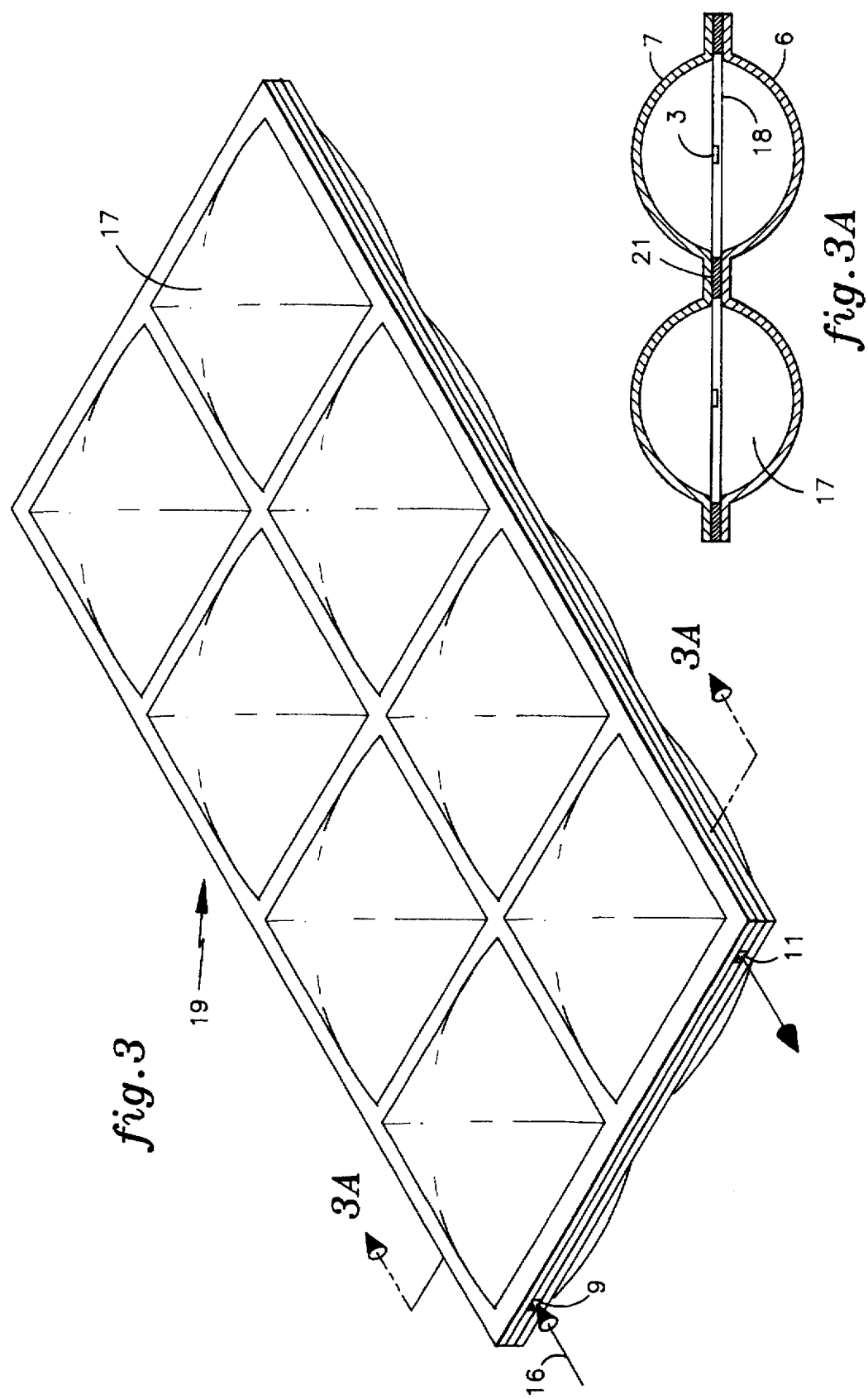
FIG. 3 is a perspective illustration of the partially superplastically expanded cell sheets.

In an alternative preferred embodiment of the current invention the cell sheets 6,7 of the closed cells 15 are superplastically expanded by inert gas to a partial expansion level. This operation can be combined with the diffusion bonding cycle outlined above or be performed subsequently in a separate operation. In the preferred method the stack-up of the tooling pattern sheet, the rib pattern sheet 1 and the cell sheets 6,7 are heated in a platen press in a partial vacuum to a point within the superplastic range of the material, typically about 1675° F.–1725° F. for the titanium alloy Ti6Al4V. The tooling pattern sheet maintains the force of the platens on the rib locations and provides for a space between the cell sheets and the platens to allow expansion of the closed cells 15. Once the stack-up has reached the target temperature a nominal pressure load is applied by the platens against the tooling pattern sheets 6,7 for a period of fifteen minutes. The platen pressure is then increased to about 500 psi at a rate of 38 psi per minute and then Argon gas is supplied to the closed cells 15 of the hollow article 10 to a level of about 100 psi at a rate of 5 psi per minute to superplastically form the cell sheets. The level of pressure varies according to cell sheet thickness and in the preferred embodiment the forming pressures relate to cell sheet thickness of about 0.032 to 0.045 inches. These conditions are maintained for 30 minutes to produce the partially inflated hollow article illustrated in FIG. 3. As illustrated in FIG. 3A the cell sheets 6,7 have been superplastically expanded between the rib bond locations 21 to form partially expanded cells 17.

Figure 4:
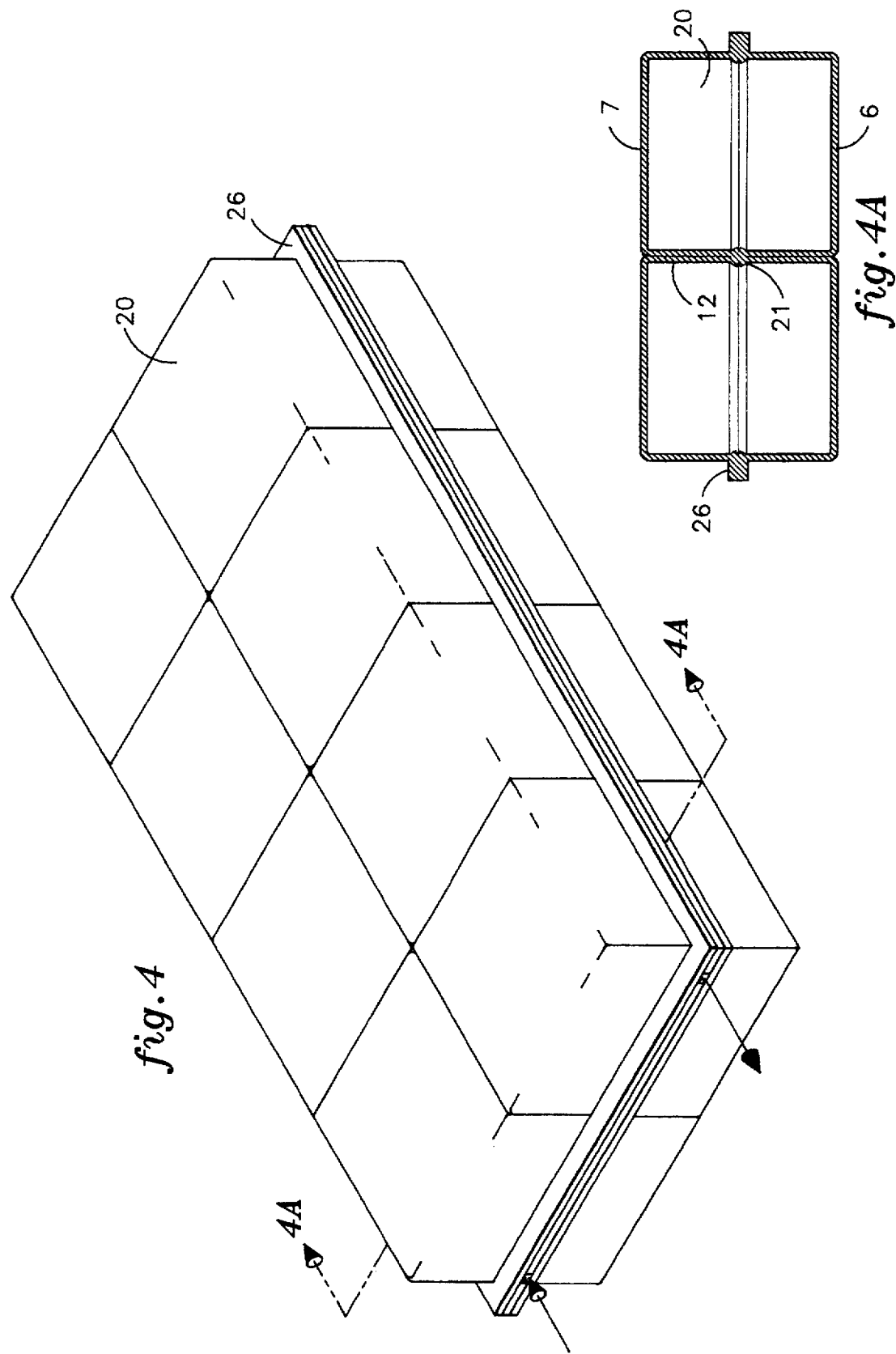
FIG. 4 is a perspective illustration of the superplastically expanded cell sheets in FIG. 2 diffusion bonded in accordance with the present invention.

In yet another alternative preferred embodiment of the current invention the cell sheets 6,7 of the partially expanded cells 17 are superplastically expanded by inert gas to a fully expanded condition. In the preferred method the partially inflated hollow article 19 is heated in a platen press to a point within the superplastic range of the material, typically 1675° F.–1725° F. for the titanium alloy Ti6Al4V. The inflated hollow article 19 is maintained at a partial vacuum of approximately $5 \times 10^{-4}$ Torr during the entire process cycle. The platen press is fitted with a mold, not shown, to limit the expansion of the cells and define the shape of the inflated cells. The mold closes on the periphery 26 of the hollow article. Once the partially inflated hollow article 19 has reached the target temperature a nominal pressure load is applied by the platens against the periphery 26 for a period of fifteen minutes. The platen pressure is then increased to about 500 psi at a rate of 38 psi per minute and then Argon gas is supplied to the partially expanded cells 17 of the partially inflated hollow article 19 to a level of about 100 psi at a rate of 5 psi per minute. During this pressurization cycle, the cell sheets are superplastically expanded to contact with and take the shape of the mold. These conditions are maintained for 30 minutes to produce the fully inflated hollow article 22 illustrated in FIG. 4. As illustrated in FIG. 4A the cell sheets 6,7 have been superplastically expanded between the rib bond locations 21 to form fully expanded cells 20. As illustrated in FIG. 4A the cell sheets 6,7 have been superplastically expanded to a point where the cell sheets have completely enveloped the rib bond locations 21 and the cell sheets are forced together by the internal gas pressure and are diffusion bonded together to form cell walls 12.

Figure 5:
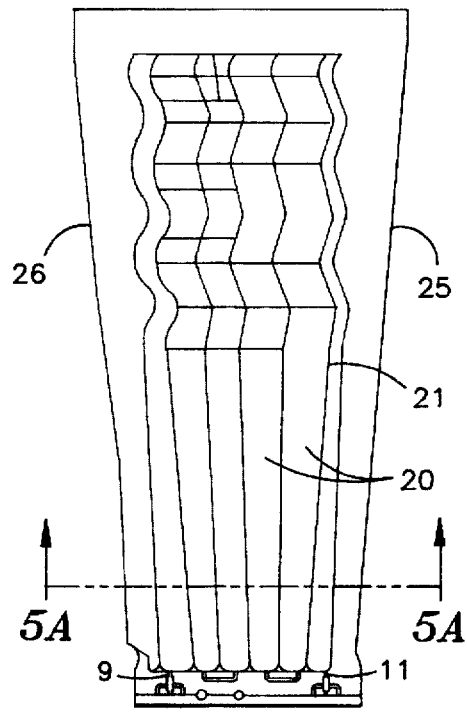
FIG. 5 is a plan view of a hollow fan blade illustrating the superplastically expanded cell sheets diffusion bonded to airfoil halves.
Figure 5A:
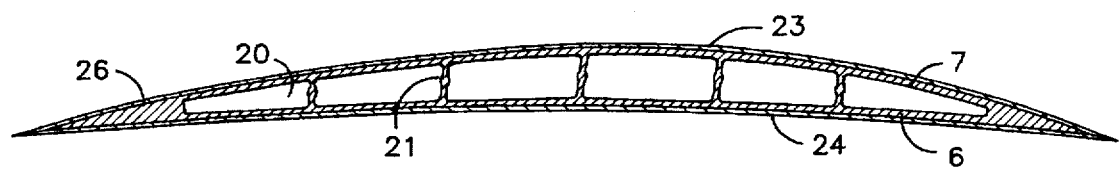
FIG. 5A is a cross-sectional view taken along line 5A—5A of FIG. 5.

In yet another embodiment of the current invention the fully inflated hollow article is diffusion bonded to other structural members. In the preferred embodiment the structural members are airfoil halves, not shown, such that after bonding a hollow reinforced airfoil is produced. The diffusion bonding operation can occur as part of the full inflation process outlined above or as a subsequent operation to a previously fully inflated hollow article. In the preferred case of combining the full expansion inflation process with the diffusion bonding to the airfoil halves, the airfoil halves 23, 24 are placed on either side of the partially inflated hollow article and loaded into a platen press fitted with a mold. The airfoil halves are positioned in the mold at a prescribed distance apart from each other to produce the proper finished airfoil shape subsequent to bonding. The partially inflated hollow article and airfoil halves are heated to temperature of about 1650° F. to 1750° F. in a partial vacuum. The platen press is pressurized to produce a bonding force on the periphery 26 of the part reactive force against the Argon gas pressure. The pressure of the Argon gas is increased at a rate of 5 psi per minute to a maximum of 300 psi until full inflation is achieved whereby a hollow airfoil structure 25 illustrated in FIG. 5 is formed. As is illustrated in FIG. 5A the cell sheets 6,7 have been inflated to fully expand and to contact the airfoil halves 23,24. The heated pressurization cycle is held for one hour to complete diffusion bonding of the airfoil halves 23, 24 to the cell sheets 6,7.

In still another embodiment of the present invention the hollow airfoil is formed into a predetermined shape subsequent to bonding with the airfoil halves through a conventional molding process.

The current invention eliminates the use of welds or internal maskants to produce a superplastic formed diffusion bonded hollow article. The elimination of maskants does away with the need to subsequently remove the maskant and the structural debit associated with embrittlement caused by the maskant. The elimination of welding precludes structural debits of fatigue and stress concentrations associated with the weld locations.

While we have described particular embodiments of the current invention for purposes of illustration, it is well understood that other embodiments and modifications are possible within the spirit of the invention. Accordingly, the invention is not to be limited except by the scope of the appended claims.

What is claimed is:
1. A hollow article comprising:
   (a) a metal rib pattern sheet containing at least two apertures, the rib pattern sheet forming a plurality of ribs and having a first and second surface;
   (b) a first cell face sheet diffusion bonded to the first surface of the rib pattern sheet ad a second cell sheet diffusion bonded to the second surface of the rib pattern sheet, the cell face sheets cooperating with said at least two apertures to create at least two closed cells; and
   (c) at least one passageway arranged to permit fluid flow between said at least two closed cells, and
   (d) at least one passageway arranged to permit fluid flow between at least one of said closed cells and the exterior of said hollow article wherein a portion of at least one of the cell sheets has been superplastically expanded between the ribs and wherein a portion of at least one of the cell sheets adjacent to the rib pattern sheet interface has been sufficiently superplastically expanded so as to totally envelope the rib, and diffusion bonded to an expanded portion of the cell sheet by an adjacent operation thereby forming a plurality of cell walls about the rib.

2. A hollow article as defined in claim 1 wherein a portion of the cell sheets disposed at opposite ends of each cell wall is molded into a predetermined shape.

3. A hollow article as defined in claim 2 wherein the hollow article is disposed within and diffusion bonded to contoured skins thereby forming a hollow molded contoured article.

4. A hollow fan blade wherein the hollow article as defined in claim 2 is disposed within and diffusion bonded to an airfoil shape.

5. A hollow article as defined in claim 2 wherein the hollow article is bonded to additional structural members.

6. A hollow article as defined in claim 1 wherein the hollow article is disposed within and diffusion bonded to contoured skins thereby forming a hollow molded contoured article.

7. A hollow fan blade wherein the hollow article as defined in claim 1 is disposed within and diffusion bonded to an airfoil shape.

8. A hollow article as defined in claim 7 wherein the hollow article is bonded to additional structural members.

9. A hollow article as defined in claim 1 wherein the hollow article is bonded to additional structural members.

10. A method for producing a hollow article comprising:
    (a) providing a rib pattern sheet having at least one aperture;
    (b) providing two tooling pattern sheets having a pattern of apertures similar to the rib pattern sheet;
    (c) providing two cell sheets;
    (d) providing a layer of stop off material between the cell sheets and the tooling pattern sheets;
    (e) arranging the rib pattern sheet between the two cell sheets with the tooling pattern sheets enclosing the two cell sheets and aligned to correspond with the rib pattern sheet; and
    (f) applying heat and pressure to the tooling pattern sheets, the heat and pressure parameter being selected to cause diffusion bonding whereby the ribs diffusion bond to the cell sheets.

11. A method as defined in claim 10 wherein the temperature is adequate to cause at least one of the cell sheets to become superplastic.

12. A method as defined in claim 11 including passageways in the ribs throughout the pattern and in the periphery of the rib pattern sheet to provide an interconnecting gas path among the cells; providing a means for transmitting gas to the interconnecting gas path; and supplying gas through the transmitting means to expand the cells.

13. A method as defined in claim 12 further comprising the step of expanding the cells against a die surface thereby limiting their expansion.

14. A method as defined in claim 13 further comprising the step of expanding the cell walls to the extent wherein adjacent cell walls come into contact and diffusion bond.

15. A method as defined in claim 14 including the simultaneous diffusion bonding of contoured skins to the hollow article thereby forming a hollow metallic contoured article.

16. A method for producing a hollow fan blade as defined in claim 15 wherein the contoured skins are an airfoil shape.

17. A method as defined in claim 14 including the subsequent diffusion bonding of contoured skins to the hollow article thereby forming a hollow metallic contoured article.

18. A method for producing a hollow fan blade as defined in claim 17 wherein the contoured skins are an airfoil shape.

19. A method as defined in claim 14 including the simultaneous diffusion bonding of at least one other structural member to the hollow article thereby forming a hollow metallic reinforced structure.

20. A method as defined in claim 14 including the subsequent diffusion bonding of at least one other structural member to the hollow article thereby forming a hollow metallic reinforced structure.

* * * * *